J. KOPP.

NURSERY CHAIR.

No. 7,246. Reissued Aug. 1, 1876.

Witnesses:

H. C. Mattenberg

W. Lovell

Inventor:

John Kopp per G. Mappenbeck

Atty

N. PETERS, PHOTO-LITHOGRAPHER, WASHINGTON, D. C.

UNITED STATES PATENT OFFICE.

JOHN KOPP, OF BRIDGEPORT, CONN., ASSIGNOR, BY MESNE ASSIGNMENTS, TO THOMPSON, PERLEY, AND WAITE, OF BALDWINSVILLE, MASS.

IMPROVEMENT IN NURSERY-CHAIRS.

Specification forming part of Letters Patent No. 60,389, dated December 11, 1866; reissue No. 7,246, dated August 1, 1876; application filed June 28, 1876.

*To all whom it may concern:*

Be it known that I, JOHN KOPP, of Bridgeport, in the county of Fairfield and State of Connecticut, have invented a new and Improved Combined Baby-Chair and Table; and that the following is a full, clear, and exact description of the same, reference being had to the accompanying drawings, and to the letters of reference marked thereon, making part of this specification.

This invention consists in a child's chair hinged to the top of a suitable low table or stand in such manner that when the chair is placed on the floor, it will become a low chair placed in front of the table or stand, so that the child will be securely retained in the chair by the table; and when the chair is placed on the top of the table or stand, it then becomes a high chair, capable of the same use as ordinary high chairs, the adjustment of the chair, whether as a high or low chair, being facilitated by the flexible or yielding connection holding the chair and stand together.

Figure 1:
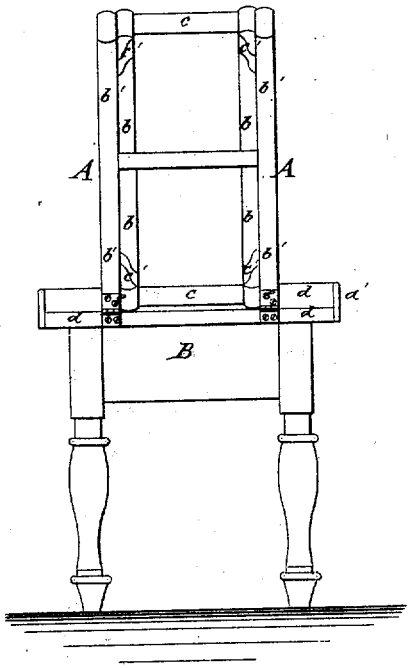
Figure 2:
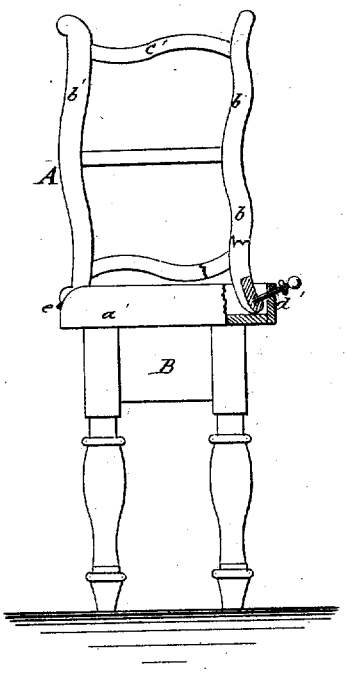
Figure 3:
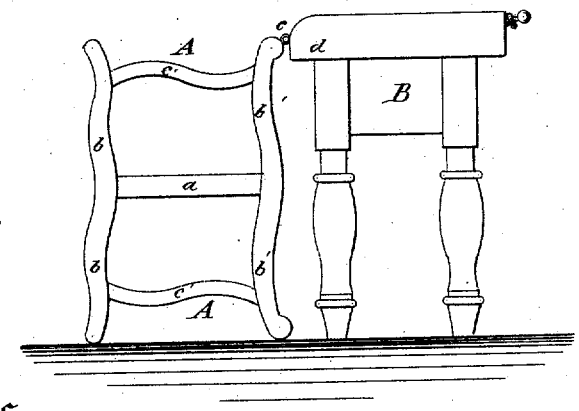

In the accompanying sheet of drawings, Figure 1 is a front elevation of my invention when used as a high chair. Fig. 2 is a side elevation of the same, represented as with a small portion broken away in order to show the manner of locking the chair fast upon the table, when used as a high chair; and Fig. 3 is a side elevation of the same, showing the relative position of the chair and table, when the chair is used as a low chair.

Similar letters of reference indicate corresponding parts in the several figures.

The reversible chair is shown at A, and *a* represents the bottom thereof, each of the two opposite sides of the said bottom being of such shape as to constitute a suitable seat when brought uppermost, as the chair is placed in one position or the other, as will be hereinafter fully set forth, and the posts *b b'* and transverse bars *c c'*, which constitute, respectively, the legs and cross-braces of the chair, when in one position, forming the back and arms thereof when in the other or reversed position, the back of the chair being thus indicated at *b c*.

The table is represented at B, and may be of any suitable construction, but preferably with a rectangular top, *d*. One end of each of the forward posts *b'* of the chair is hinged or otherwise secured to the front edge of the top *d*, by suitable hinges *e*, in such manner that when the chair is turned downward with one end upon the floor, it will be situated immediately in front of the table B, and constitute a low chair, as represented in Fig. 3, and when turned upward around the hinges *e*, or other flexible connection, the opposite end thereof will be made to rest upon the top *d* of the table, as shown in Figs. 1 and 2, those parts which in the first instance formed the lower portion of the chair A constituting in this the upper portion of the same, and the said chair being by these means supported upon the table, and raised up to a height equal or corresponding to that of the high chairs in common use, in the place of which, when thus situated upon the table B, it may be employed, the chair A being kept from tilting forward by a pin, *f*, which passes through a suitable hole formed in the back piece *d'*, and has its inner end fitted into a suitable socket or recess formed in the back of the chair, as shown at *i* in Fig. 2.

When the chair is in the position shown in Fig. 3, in order to be used as a low chair, as hereinafter described, the child or infant when placed therein is prevented from falling or escaping therefrom by the table B, situated immediately in front of the same, and when placed upon the table B, and thus constituting a high chair, as hereinbefore fully set forth, is employed to hold the infant in the same manner as those ordinarily in use, by which means the use of the chair is rendered much more convenient and economical than such ordinary chairs, inasmuch as it is capable of serving the double purpose of a high and low chair, as herein specified.

I am aware of the patent of Carpenter granted in 1855, which shows a chair-seat hinged to legs or standards, and convertible into a crib or a high or rocking chair.

Having thus described my invention, what I claim as new, and desire to secure by Letters Patent, is—

1. The combination of the reversible chair with the table, whereby the chair may be used eitheir as a high or low chair, substantially as herein set forth.

2. A child's chair combined with and secured to a table or stand by means of hinged joints, whereby the same may be used either as a high or low chair, substantially as described.

JOHN KOPP.

Witnesses:
DAVID B. LOCKWOOD,
ALFRED B. BEERS.